Dec. 21, 1965   R. KOMPFNER   3,224,330
OPTICAL REFLECTING SYSTEM FOR REDIRECTING ENERGY
Filed Dec. 22, 1961   2 Sheets-Sheet 1

INVENTOR
R. KOMPFNER
BY Kenneth W. Mateer
ATTORNEY

United States Patent Office 3,224,330
Patented Dec. 21, 1965

3,224,330
OPTICAL REFLECTING SYSTEM FOR
REDIRECTING ENERGY
Rudolf Kompfner, Middletown, N.J., assignor to Bell
Telephone Laboratories, Incorporated, New York, N.Y.,
a corporation of New York
Filed Dec. 22, 1961, Ser. No. 161,566
4 Claims. (Cl. 88—57)

This invention relative to optical maser communication systems and, more particularly, to reflectors for use as energy redirection devices in such systems.

In the area of transmission of signal bearing electromagnetic wave energy from point to point, there has been a constant expansion of the useful range of operating frequencies. In general, the trend is toward higher and higher frequencies. Recently, the advent of a continuously operable maser capable of generating coherent radiation in the $10^{-2}$ to $10^{-6}$ centimeter optical wavelength range, as described in an article appearing in Physical Review Letters, February 1, 1961, at page 106 and entitled "Population Inversion and Continuous Optical Maser Oscillations in a Gas Discharge Containing a He-Ne Mixture," by A. Javan, W. R. Bennett, Jr., and D. R. Herriott, has intensified the interest in the transmission of signal information on a modulated "light beam." Use of a solid state optical maser in such a system is likewise feasible.

However, the opening up of this new frequency range of communication has resulted in the realization that many of the well known signal manipulation techniques and structures common in the lower frequency ranges are no longer applicable. Accordingly, new techniques and associated structures in certain areas must be devised.

One such area involves the transmission medium itself.

In a coherent light communication system, many light beams are transmitted by means of many relatively short straight sections from a first terminal point to a second terminal point which is several hundred miles away. These light beams must be shielded from atmospheric effects such as rain, fog, and refractions due to other inhomogeneities. One contemplated means for guiding the optical or near-optical frequency energy having wavelengths between $10^{-2}$ and $10^{-6}$ centimeters comprises a cylindrical tube which is known descriptively as a "light pipe." Since the electromagnetic energy involved travels in rectilinear fashion, redirection means for changing the energy propagation direction are necessary. Specifically, such redirection means are necessary not only to follow nonlinear rights-of-way and to effect convenient changes in propagation direction at repeater stations but also to effect simple city-to-city transmission due to the curvature of the surface of the earth.

In broadband communication systems, such as an optical maser system, loss and coherence considerations are extremely important. The major potential causes of loss and phasal interference are the plurality of redirection means at which the propagation direction is changed. Typically, combinations involving lenses and prisms have been used to effect direction changes in the short distance prior art optical systems involving incoherent light. However, there are several undesirable aspects of such means when used in a system involving the transmission of coherent energy over distances of hundreds of miles. For example, optical perfection is required on both surfaces of lenses and prisms as well as internally; chromatic correction is necessary in view of the general relationship between refractive index and frequency; surface reflections from lenses and prisms would couple forward and backward modes of propagation thus rendering difficult the use of a single transmission path for opposite propagation directions; and, finally, adjustments of the focal length or bending angles of lenses and prisms are difficult while the device remains in place within the transmission system.

It is, therefore, an object of the present invention to transmit broadband coherent optical frequency energy over long distance with low attendant losses.

It is a further object of the invention to change the direction of propagation of coherent optical frequency energy in a simple and efficient manner.

It is a more specific object of this invention to redirect optical frequency wave energy by means of low loss, broadband means subject to simple and efficient adjustment of the redirection angle.

In accordance with the invention, a long distance optical maser communication system includes redirection means comprising pairs of curved reflecting surfaces having related cylindrical curvature. The reflecting surfaces of each pair are disposed with respect to each other such that the focal planes thereof are orthogonal.

Each pair of reflectors is characterized by a focal length of thousands of feet, and the pairs are themselves spaced along the transmission medium such that their separation approximates the sum of the focal lengths of adjacent pairs. Thus, the system comprises a plurality of substantially confocal reflector pairs. The angle of redirection at each pair is controlled in each of two dimensions by tilting the associated reflectors.

The above and other objects of the present invention, its nature and its various features and advantages, will appear more fully from a consideration of the accompanying drawing and the detailed description thereof which follows.

Figure 1:
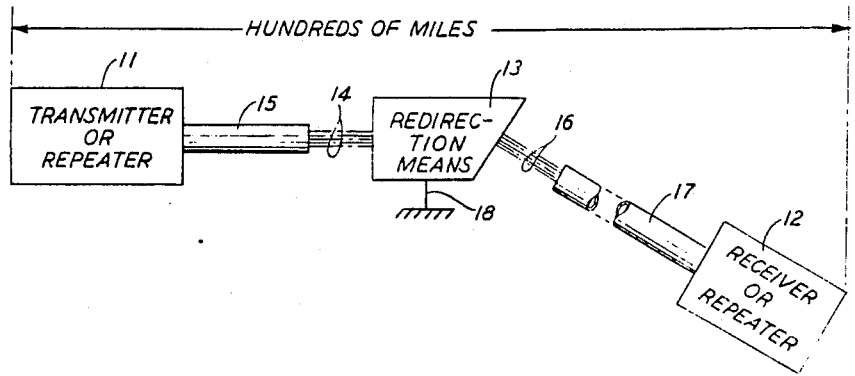
FIG. 1 is a diagrammatic representation of a long distance communication system for coherent wave energy in the optical frequency range.

Referring more particularly to FIG. 1, a light wave communication system is illustrated in which stations 11, 12 are either terminal points of the system or repeater stations therealong. In any event, the distance between stations is of the order of hundreds of miles, and the system itself is therefore properly classified as "long." Since long distances are involved, and since it is well known that the electromagnetic wave energy involved travels in straight lines, it is necessary for the light beam direction to be periodically changed, if not due to natural obstructions or right-of-way considerations, then due to the earth's curvature. Therefore, interposed between stations 11, 12 and spaced at intervals determined by power level and transmission attenuation considerations are a plurality of energy redirection means such as element 13. Element 13 receives energy rays 14 traveling in a first rectilinear direction through hollow cylindrical tube 15 and emits the received energy as rays 16 traveling through cylindrical tube 17 in a second rectilinear direction which is angularly related to said first direction. Tubes 15, 17 have a diameter sufficiently larger than the light beams enclosed thereby to have negligible influence, other than shielding, upon their propagation. These tubes can be evacuated, or they can be filled with an inert gas such as argon maintained at a pressure at which scattering becomes unimportant. Furthermore, the light tubes or pipes can be buried underground together with redirectors 13 and their associated supporting platforms 18 or they can be mounted above ground. Supporting platforms 18 are vibration free and are decoupled from their surroundings much in the manner of seismographs and delicate galvanometers. Decoupling is necessary to eliminate deviations in light beam direction due to the vibrations of the redirectors.

Typically, redirectors 13 are spaced apart at distances between one-half and one mile. Thus, in FIG. 1 although only one redirector is illustrated, tube 17 is broken to indicate the omission of similar redirectors spaced at typical intervals along the hundreds of miles of the illustrated system. Accordingly, signal information bearing energy originating at station 11 is received at station 12, having been redirected perhaps hundreds of times. In a similar manner, energy originating at station 12 is multiply redirected and is ultimately received at station 11.

In accordance with the present invention, redirector 13 comprises a pair of cylindrical reflecting surfaces spaced apart and disposed with orthogonal focal planes. A more complete understanding of the reflectors involved can be gained from reference to FIGS. 2, 3A and 3B.

Figure 3A:
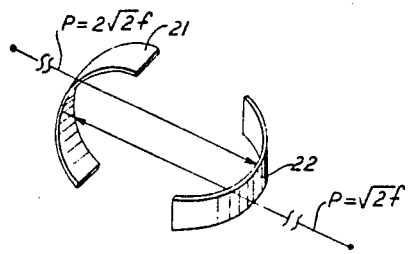
FIG. 3A is a more detailed view of one of the redirectors of FIG. 2.

Referring first to FIG. 3A, curved reflecting surfaces 21, 22 are illustrated which, when taken together, form a single redirection means such as redirector 13 of FIG. 1. Each reflector is curved in one direction only and, as illustrated in FIG. 3A, the planes described by the radii of curvature $p$ of each reflector are normal. An alternate way of describing the spatial relationship is that the focal planes associated with the reflectors are normal. Reflectors 21, 22 are highly reflective and comprise, for example, portions of silver-plated or gold-plated metallic cylinders. If desired for purposes of reducing reflection losses, reflectors 21, 22 can be coated with a plurality of thin low loss dielectric layers. Reflector 21 has a radius of curvature equal to $\sqrt{2}f$ and reflector 22 has a radius of curvature $2\sqrt{2}f$ where $f$ is the focal length of the reflector combination which is typically of the order of 1500 feet. Thus, as will be readily appreciated, the curvatures illustrated in FIGS. 3A and 3B are exaggerated for purposes of illustration.

Figure 3B:
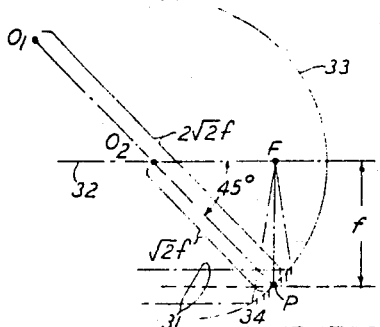
FIG. 3B is a graphical representation given for purposes of explanation.

The radii of curvature $\sqrt{2}f$ and $2\sqrt{2}f$ associated with reflectors 21, 22 are the radii associated with a portion of a paraboloidal surface of revolution as illustrated in FIG. 3B. In FIG. 3B incoming rays 31 are parallel to axis 32 and, upon striking paraboloidal surface 33, are reflected thereby and focused at point F, at a distance $f$ from point P at the center of the active reflecting portion 34 or paraboloid 33. Reflecting portion 34 is characterized by dual curvature, one curvature having its center at $O_1$, in the plane of the paper, of radius $2\sqrt{2}f$; the other curvature having its center at $O_2$, in a plane normal to the paper, of radius $\sqrt{2}f$. From these parameter relationships, it can be concluded that a single reflecting surface inclined at 45 degrees to the incoming rays and possessing radii of curvature $2\sqrt{2}f$ in the plane of the reflection and $\sqrt{2}f$ in the plane normal to the plane of reflection, possesses the focusing properties of a spherical reflector of focal length $f$.

Thus, and in accordance with the invention, a pair of reflectors, as illustrated in FIG. 3A, one of which has a radius of curvature of $2\sqrt{2}f$ in the plane of reflection and in that plane only, and the other of which has a radius of curvature of $\sqrt{2}f$ in the plane normal to the plane of reflection, will function with respect to focal length considerations the same as the doubly curved single reflector described above. However, with two reflecting surfaces instead of only one, the reflection can be controlled separately in two directions, the direction of propagation can be changed by relatively small amounts, and the fabrication process is simplified since only a single valued curvature per reflector is involved.

Figure 2:
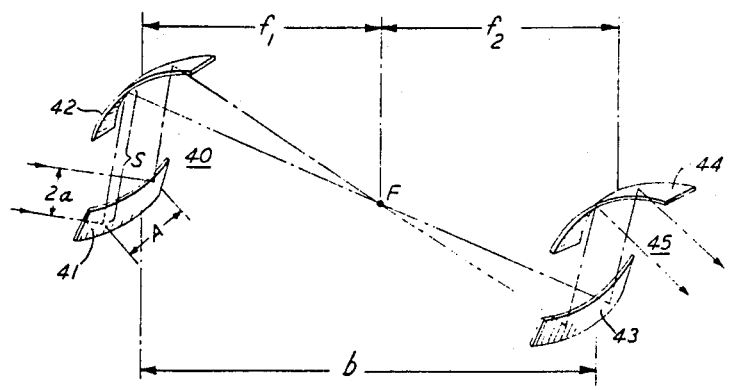
FIG. 2 is a perspective view of redirection means in accordance with the invention.

Further understanding of the reflector pairs in accordance with the invention can be gained from reference to FIG. 2 in which two reflector pairs 40, 45 are illustrated as part of a transmission system. In FIG. 2 reflectors 41, 42 comprise a reflector pair or redirector 40 having an effective focal length $f_1$. A light beam having an effective cross-sectional radius $a$ is incident upon the surface of reflector 41 at an angle of 45 degrees to the tangent to the center of the illuminated area. Effective radius $a$ is derived from geometrical considerations and is equal to $$\frac{A}{\sqrt{2}}$$

where A is the longest dimension of the reflector surface over which optical perfection is required. Reflectors 41, 42 comprise a highly reflective material which can be coated with thin dielectric layers as described with reference to FIG. 3A. Reflectors 41, 42 are separated a distance S which is sufficiently small with respect to the focal length $f_1$ that it produces a negligible effect upon the focusing properties of the reflector pair and may therefore be neglected. Spaced away from redirector 40 is a second redirector 45 comprising reflectors 43, 44. Structurally, reflectors 43, 44 are substantially identical to reflectors 41, 42. Redirector 45 has a focal length $f_2$ associated therewith and, in further accord with the invention, redirectors 40, 45 are spaced apart a total distance $b$ which is equal to the sum of focal lengths $f_1$, $f_2$. Stated differently, redirectors 40, 45 are confocal. Thus, energy propagating from redirector 40 is focused thereby at point F, which is also the focal point of redirector 45. The energy defocuses beyond point F and is ultimately incident upon reflector 43. If $f_1$ and $f_2$ are equal, the energy incident upon reflector 43 illuminates substantially the same area thereon as was illuminated on reflectors 41 and 42. The direction of propagation of energy emerging from a given redirector may be easily controlled by the relative angular positioning of the reflectors of the pair. By changing this relative positioning, i.e., by tilting one reflector slightly, the angle of the emergent energy with respect to the incoming energy can be changed. In this manner, propagation of optical frequency energy over prescribed rights-of-way and around or over natural obstructions such as mountains can be accomplished.

A system involving a plurality of straight transmission sections separated by reflective redirection means is stable from path perturbations and, for optimum performance, the ratio of (beam radius)$^2$ to the product of redirector separation times wavelength should be substantially equal to unity. In a typical system, with losses of 2 percent at each redirector, a wavelength of $.7 \times 10^{-4}$ centimeters, and an overall loss of 60 decibels between terminals, a distance of 400 miles can be spanned without amplification or regeneration. Such a system requires a transmitter power of a few watts for a channel bandwidth of $10^{-10}$ cycles with a signal-to-noise ratio of 20.

Figure 4:
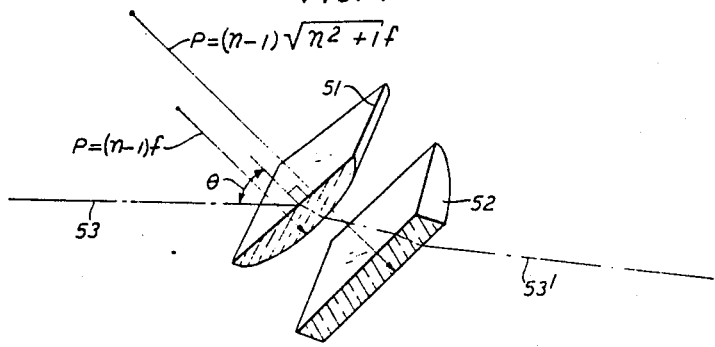
FIGS. 4 and 5 illustrate lens and prism equivalents of the redirectors of FIG. 2.
Figure 5:
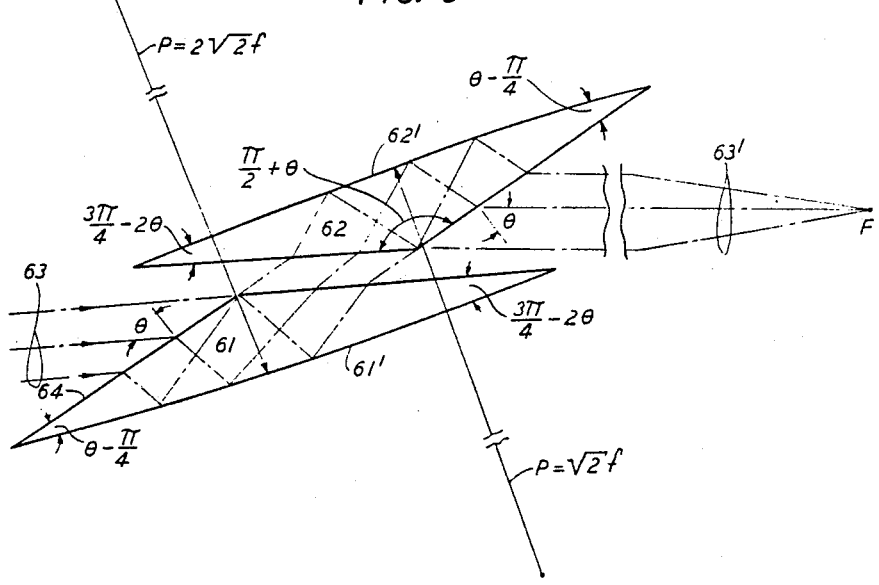

FIGS. 4 and 5 illustrate lens and prism pair equivalents of the reflector pairs described above. As stated hereinabove, bandwidth considerations and physical tolerances associated with these structures are less attractive for coherent energy transmission than those of the reflector pairs described above. Nevertheless, for some purposes, such as narrow band transmission, these structures have considerable utility.

Specifically in FIG. 4, lenses 51, 52 are illustrated in partial cross section with the path of a centrally incident light beam traced as broken line 53–53'. Lenses 51, 52 comprise optical quality glass of refractive index $n$, and are plano-convex cylindrical. As illustrated, the curved surface of lens 51 is described by a radius of curvature equal to $(n-1)f$ while the curved surface of lens 52 has a radius of curvature equal to $(n-1)\sqrt{n^2+1}f$ where $f$ is the focal length of the lens pair. The lenses are oriented relative to each other with their focal planes orthogonal. Thus, whereas each of cylindrical lenses 51, 52 focuses in only one plane, focusing in two directions is provided by their combination. Light beam 53 is incident upon the lens combination at an angle $\theta$ which is the angle commonly known in the art as the Brewster angle. The Brewster angle depends upon the refractive index of the lens material and is the angle whose tangent equals that refractive index. By positioning the lens pair with the plane surface of lens 51 at the Brewster angle, surface reflections of incident energy polarized in the plane of incidence are minimized. As a result of passing through the lens pair, the direction of the incident beam is changed from that indicated by line portion 53 in FIG. 4 to that of line portion 53' which is angularly related to portion 53. By changing the lateral placement of lenses 51, 52, the amount of angular variation between the directions of line portions 53 and 53' can be controlled.

FIG. 5 illustrates, in cross section, a prism equivalent of the reflector pair of FIG. 3A. Each of prisms 61, 62 has two flat surfaces and one convex cylindrical surface. The convex cylindrical surfaces 61', 62' are characterized by curvatures having radii $2\sqrt{2}f$ and $\sqrt{2}f$, respectively, where $f$ is the focal length of the prism pair. Prisms 61, 62 comprise high quality optical glass to minimize transmission losses, dispersions and distortions. Substantially plane parallel light rays 63 are incident upon plane surface 64 of prism 61 at the Brewster angle and are refracted toward cylindrical surface 61' at which total internal reflection occurs. The rays continue into prism 62, being reflected from cylindrical surface 62' and thence outward into the transmission medium again toward focal point F as rays 63'. As is evident from FIG. 5, rays 63' and 63 are angularly related by a finite non-zero angle. Similar prism combinations would be spaced at distances equal to $2f$ along the transmission path. The prism angles depend in part upon the Brewster angle of incidence $\theta$, as seen from the specific dimensioning parameters given in FIG. 5.

In all cases, it is understood that the above-described arrangements are intended to be illustrative of some of the specific embodiments which can represent an application of the principles of the present invention. Numerous and varied other arrangements can be devised in accordance with these principles by those skilled in the art without departing from the spirit and scope of the invention.

What is claimed is:

1. A transmission system for optical or near-optical wavelength energy comprising
    a source of said wave energy having a given direction of propagation,
    means for receiving said wave energy spaced away from said source,
    and a plurality of means for changing the propagation direction of said energy,
    each of said last recited means having a focal length $f$ and comprising a first element having a cylindrical energy reflecting surface with a radius of curvature $2\sqrt{2}f$ lying in a first plane and a second element having a cylindrical energy reflecting surface with a radius of curvature $\sqrt{2}f$ lying in a second plane, which is substantially orthogonal to said first plane,
    said first and second elements being separated a distance small with respect to $f$ with reflecting surfaces facing each other,
    said direction changing means being spaced apart from each other along said system a distance $2f$.

2. In combination, a first optical energy redirector having a focal length $f$,
    and a second optical energy redirector having a focal length $f$ spaced apart from said first redirector a distance $2f$ and oriented to receive energy directed by said first redirector,
    said first and said second redirector each comprising a first cylindrical energy reflector having a radius of curvature $2\sqrt{2}f$ lying a first plane and a second cylindrical energy reflector having a radius of curvature $\sqrt{2}f$ lying in a second plane which is substantially orthogonal to said first plane,
    said first and second reflectors of each redirector being spaced apart a distance negligible with respect to $f$,
    the cylindrical reflectors of each redirector being oriented with concave surfaces facing each other.

3. In combination with the combination according to claim 2, means for illuminating said first redirector with optical frequency energy,
    and means oriented to receive said energy from said second redirector.

4. The combination according to claim 3 in which said receiving means comprises a third optical energy redirector having a focal length $f$ which is spaced from said second redirector a distance $2f$,
    said third redirector comprising first and second cylindrical energy reflectors.

References Cited by the Examiner

UNITED STATES PATENTS

| | | |
|---|---|---|
| 1,785,347 | 12/1930 | Herrschaft. |
| 2,084,795 | 6/1937 | Donle. |
| 2,769,373 | 11/1956 | Bouwers _____ 88—57 |

FOREIGN PATENTS 91,069   5/1959   Netherlands.

JEWELL H. PEDERSEN, *Primary Examiner.*